United States Patent [19]

Kollmar

[11] 3,951,809

[45] Apr. 20, 1976

[54] FILTER PRESS

[75] Inventor: Ulrich Kollmar, Pforzheim-Wurm, Germany

[73] Assignee: Gebrueder Bellmer KG. Maschinenfabrik, Niefern, Germany

[22] Filed: Oct. 24, 1973

[21] Appl. No.: 409,037

[30] Foreign Application Priority Data

| | | |
|---|---|---|
| Oct. 28, 1972 | Germany | 2252979 |
| Nov. 18, 1972 | Germany | 2256735 |
| Aug. 16, 1973 | Germany | 2341360 |

[52] U.S. Cl. .......... 210/241; 210/386; 210/400

[51] Int. Cl.$^2$ .......... B01D 33/04

[58] Field of Search .......... 100/118, 119, 120, 151, 100/152, 153, 154; 210/386, 396, 400, 401, 406, 241; 162/129

[56] References Cited

UNITED STATES PATENTS

| | | | |
|---|---|---|---|
| 1,875,075 | 8/1932 | Mason | 162/129 |
| 3,315,370 | 4/1967 | Hikosaka | 100/118 X |
| 3,363,761 | 1/1968 | Groth et al. | 210/241 |
| 3,426,908 | 2/1969 | Davis et al. | 210/406 X |
| 3,430,583 | 3/1969 | Pool et al. | 100/152 X |
| 3,446,139 | 5/1969 | Coffeit | 100/118 |
| 3,459,122 | 8/1969 | Pastoors et al. | 100/118 |
| 3,459,123 | 8/1969 | Begiebing | 100/118 |
| 3,796,149 | 3/1974 | Heissenberger | 100/118 |
| 3,800,952 | 4/1974 | Bastgen | 100/118 X |
| 3,801,250 | 4/1974 | Kaiser et al. | 100/153 X |
| 3,823,062 | 7/1974 | Ward et al. | 162/129 X |

FOREIGN PATENTS OR APPLICATIONS

| | | | |
|---|---|---|---|
| 1,202,631 | 10/1965 | Germany | 162/129 |

*Primary Examiner*—Charles N. Hart
*Assistant Examiner*—Robert H. Spitzer
*Attorney, Agent, or Firm*—Joseph A. Geiger

[57] ABSTRACT

A web filter press for the removal of liquid from sludge having an upright converging filtering space into which sludge is received from above, a dandy roll at the bottom end thereof, and a horizontal roller train, in which the webs are progressively more deflected and compressed. A horizontal prefiltering run may be arranged ahead of the upright filter space, and suction boxes may be arranged in both of these runs to enhance their filtering efficiency.

12 Claims, 2 Drawing Figures

FILTER PRESS

BACKGROUND OF THE INVENTION

1. Field of the Invention

The present invention relates to filter presses, and in particular to continuously operating web filter presses for the removal of the liquid component from suspensions, such as, for example, from fiber-containing slurries or sludge. Presses of this kind are also particularly suitable for the removal of the water from the settling sludge obtained in sewage treatment facilities.

2. Description of the Prior Art

Continuously operating web filter presses as such are known in the prior art. Such prior art presses commonly have at least two endless filter webs with oppositely facing web portions approaching one another at an acute angle so as to define, in the area of these converging web portions, a filtering space inside which the suspension is subjected to pressure, whereby the liquid is ejected through the filter webs.

One such prior art device is disclosed in U.S. Pat. No. 1,875,075 to W. H. Mason, the device consisting of a web filter press having two endless filter webs, the filtering space being defined by oppositely downwardly slanted web portions defining an acute angle between them. After leaving this tapered filtering space, the two filter webs are guided around a drum into a horizontal run in which the material contained between the two webs is further compressed by oppositely arranged rollers. The sludge or slurry is in this case directly fed from above into the open filtering space.

This prior art device thus teaches the basic approach to the liquid removal from suspensions, inasmuch as the direction of conveyance is adapted to the changing consistency of the treated material. The latter, as long as it has the consistency of a flowable liquid, is confined between substantially upright web portions within the funnel-shaped filtering space, and as its consistency becomes semi-solid or solid, the direction of conveyance is changed to the more convenient horizontal mode. In this horizontal run the material is further compressed to a cake.

Practical applications of this known web filter press are found primarily where the liquid is to be removed from fiber suspensions. It has also been found that the efficiency of liquid removal, i.e. the degree of drying obtainable, is insufficient for various other applications.

SUMMARY OF THE INVENTION

It is a primary objective of the present invention to overcome the aforementioned shortcomings, by suggesting a web filter press which is superior in drying efficiency to the prior art device of U.S. Pat. No. 1,875,075, and which is characterized by greater versatility and adaptability to a variety of applications.

In order to attain the above objective, the present invention suggests a web filter press in which the endless filter webs, after leaving the tapered filtering space, are guided around a so-called dandy roll or pulp roller, whereupon the two webs are guided through several S-shaped runs in which the webs may be deflected over an angle of 90° or more.

In a preferred embodiment of the invention it is further suggested that one or both of the endless filter webs include run portions in which they pass over suction boxes so that the suspension is subjected to the suction effect of a negative pressure.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
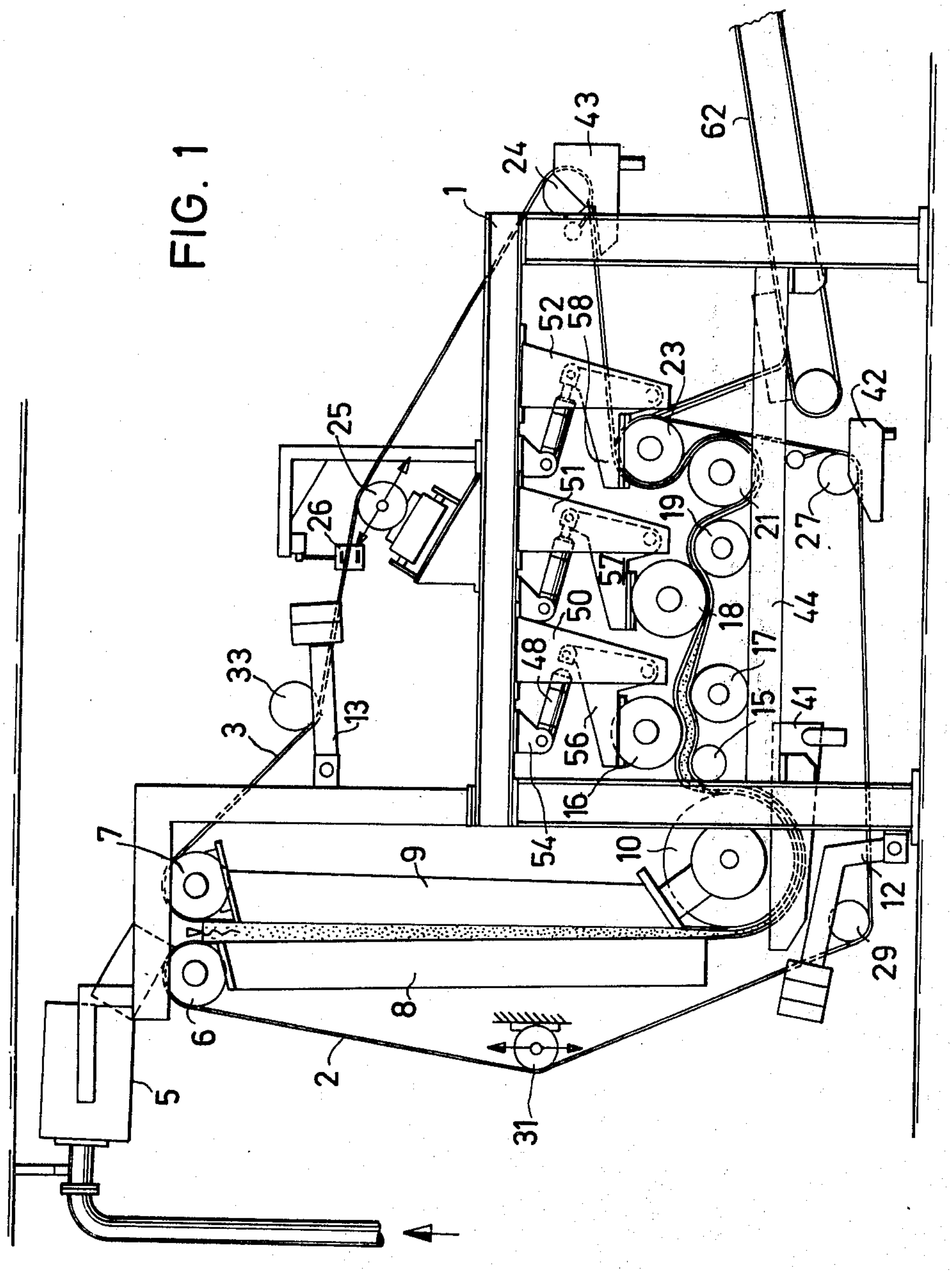
FIG. 1 shows in a somewhat simplified elevational view an embodiment of the invention.

Referring to FIG. 1, it can be seen that the filter press of the invention is supported by a frame 1 and includes two endless filter webs, an upper web 3 and a lower web 2. The webs 2 and 3 are guided over a number of rollers whose purpose is to compress, support, guide, adjust, and/or tension the two endless filter webs. The suspension which is to be dried is guided between these two webs along a treatment path. From the uppermost guide rollers 6 and 7, located in the head of the machine, the two filter webs 2 and 3 descend and gradually converge along a substantially vertical run, facing one another. In this descending run, which may be of several meters length, the filter webs are supported by guide surfaces. These supporting surfaces may be in the form of roller banks, the two opposite roller banks approaching one another in an acute angle in the downward direction. According to a preferred embodiment of the invention, these supporting surfaces are part of suction boxes 8 and 9, the inside of which is subjected to negative air pressure. The suspension conveyed between the two descending web runs thus is not only progressively compressed, but is also subjected to the suction effect of the suction boxes 8 and 9 acting on the suspension across the filter webs 2 and 3.

At the lowest point of the vertical web run, the two filter webs are further urged against one another by being guided jointly around a large guide drum 10. This guide drum 10, according to a preferred characteristic of the invention, is a so-called dandy roll or pulp roller of the spiral-lobe type whose purpose is to further compress the suspension between the two filter webs and to remove and collect the liquid which is expulsed from the suspension. Such a dandy roll is described, for example, in German Pat. No. 1,202,631. It has a drum-type, cylindrical perforated mantle with a series of inwardly extending, circumferentially regularly spaced spiral lobes. As the drum rotates, these lobes move in such a way that they lift the liquid which penetrates into the drum on the rising half of the drum periphery toward a central axial discharge opening.

The two filter webs leave the circumference of the dandy roll in the upward direction, after approximately ½ turn, being guided around a guide roller 15 into a generally horizontal run in which they are supported by support rollers 17 and 19. The webs 2 and 3 then run over a guide roller 21, enclosing the latter over a considerable angle, and immediately thereafter turn in the opposite direction around an adjustable roller 23, again over a considerable angle of deflection. The two webs leaving the roller 23 are then separated into different runs, the lower web 2 being guided downwardly toward roller 27, while the upper web 3 runs off horizontally toward roller 24. From these points onward both webs return independently to the earlier-described guide rollers 6 and 7 in the head of the machine.

In the area where the two webs arrive at the circumference of support roller 17 is further arranged an adjustable pressure roller 16 which contacts the webs from above. The web run between rollers 15 and 17 is thus deflected into a shallow S-shaped path. A similar pressure roller 18 is arranged to cooperate with the support roller 19, again deflecting the web run between the rollers 17 and 19. In this case, however, the deflection of the two webs takes the form of a more pronounced S-shape. The pressure rollers 16 and 18 are pivotably mounted on brackets 50 and 51 of the machine frame 1, the rollers themselves being carried by pivot levers 56 and 57, respectively.

One end of the pivot levers 56 and 57 is connected to an adjustment means, such as a pressure cylinder 48, as illustrated in the case of lever 56. The actuation of the pressure cylinder 48 thus moves the pressure roller 16, or 18 as the case may be, so as to adjust the pressure gap between the roller 16 and 17, or 18 and 19, respectively. The particular degree of pressure exerted between these rollers may be indicated on a control panel by means of a pressure gauge, for example, which shows the hydraulic pressure or pneumatic pressure applied to the pressure cylinder. It is, of course, also possible to use other means for mechanically adjusting the pressure gap between these rollers.

Roller 23, which is arranged above the guide and support roller 21, is similarly made adjustable, by being pivotably mounted on a frame bracket 52 and supported by a pivot lever 58. However, unlike in the case of pressure rollers 16 and 18, the web is guided a considerable angle around roller 23 so that a very pronounced S-shaped web deflection is obtained.

The particular arrangement of the roller pairs 16 and 17, 18 and 19, and lastly, 23 and 21, causes the webs 2 and 3 to run through progressively more pronounced S-shaped deflections. The independent adjustability of the pressure rollers 16, 18 and 23 also premits the establishment of a progressively higher contact pressure between the cooperating rollers on opposite sides of the webs.

In addition to the two endless filter webs 2 and 3 it is also possible to provide endless lateral sealing members which move in the same direction as the filter webs in the area of the filter zones so as to prevent the lateral loss of suspension in this area. Within this vertical run in which the filter webs converge, it is also possible to use stationary sealing members, as suggested in U.S. Pat. No. 1,875,075 for example. The endless webs 2 and 3 may be tensioned by means of weighted tensioning rollers, such as roller 29 which is mounted on weighted lever 12, or roller 33 mounted on weighted lever 13; additional tension and centering adjustment may be provided by means of adjustable rollers, such as rollers 25 or 31. The centering of the endless webs 2 and 3 may be monitored by means of edge sensors such as the sensor 26 on the upper web 3, for the purpose of automatically adjusting the web run on the tensioning roller 25, for example. Additional safety devices may further include an acoustic alarm or the like, when the lateral deviation of the web run exceeds a certain limit.

Among various applications in which the filter press of the present invention can be advantageously used is the removal of water from sewage treatment sludge. The settling sludge, before being fed to the filter press, is normally treated with a special conditioning substance. The conditioned sludge is then pumped to the head of the machine where a dosing and distributing unit 5, arranged above the head guide roller 6, feeds a continuous stream of sludge to the mouth of the converging filtering space between the descending endless filter webs 2 and 3. As the sludge descends between the gradually converging filter webs along the suction boxes 8 and 9, it is simultaneously compressed and subjected to a suction effect so that the majority of the liquid is removed from the sludge in this portion of the web run. As the two webs 2 and 3 leave the bottom of the filtering space, they are further compressed by their deflection around the circumference of the spiral-lobe dandy roll 10. The subsequent parallel run of the webs 2 and 3 over guide roller 15 and between the roller pairs 16–17, 18–19, and 23–21 subjects the two webs with the enclosed solids to progressively sharper S-shaped deflections and increasing compression between each of these roller pairs.

The drive for the two endless filter webs is accomplished by means of the two guide and compression rollers 21 and 23 which, because of their large angle of web contact and adjustability of contact pressure, provide a reliable drive for the two filter webs. The two webs separate as they leave the roller 23, and the dried cake of solids which remain from the sludge can now be removed from the filter webs by means of a simple scraping device, the cake being deposited via a chute onto a conveyor 62. The latter brings the cake either to a dump or to a transportable container, for example.

The liquid which is removed from the suspension by the dandy roll 10 is collected inside a trough 41 which communicates with a larger collecting trough 44 located under the horizontal roller train consisting of the earlier-mentioned three roller pairs. The lower rollers 17, 19, and 21 of this roller train may in addition be provided with peripheral grooves or perforations on their supporting surfaces so as to facilitate the liquid flowoff. The inside of the dandy roll 10 itself may also be subjected to a negative air pressure.

The embodiment of FIG. 1, as described above, includes at the transition point between the descending run and the horizontal roller train a so-called dandy roll 10. It should be understood, however, that the present invention is not limited to, and dependent upon, the use of such a device. It would thus be possible to replace the suggested spiral-lobe dandy roll by a hollow drum having grooves or perforations in its supporting surface. Nor is the arrangement of the aformentioned dandy roll at the transition point between the descending run and horizontal roller train the only location where it may be employed advantageously. Additional dandy rolls and/or hollow drums may be provided at other convenient places along the common path of the two filter webs.

Figure 2:
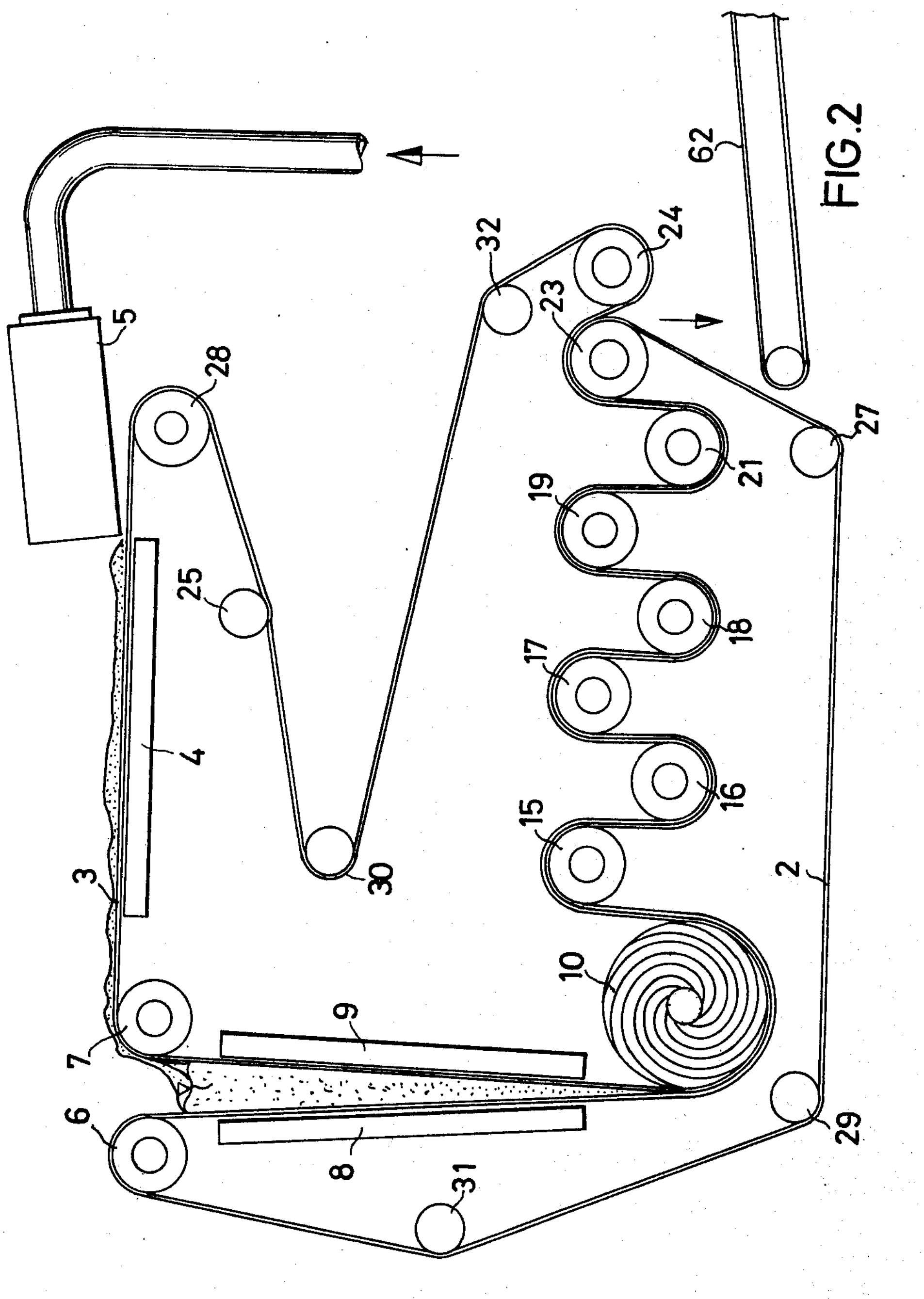
FIG. 2 shows a schematic of an elevational arrangement of a modified embodiment of the invention.

In FIG. 2 is illustrated a modified embodiment of the invention, where one of the filter webs — in this instance the upper web 3 — has an additional horizontal or slightly inclined run, and where the suspension is initially deposited onto this run portion. Over the length of this horizontal run gravity alone will remove a certain portion of the liquid contained in the suspension. The web portion in this run may be supported by a series of small supporting rollers (not shown), or the web may slide over a perforated surface. This perforated surface may further constitute one wall of a suction box 4 which applies a negative pressure to the web 3 and to the suspension conveyed by it.

The guide roller 7 at the head of the filter press deflects the upper filter web 3 from its horizontal pre-filtering run into the descending run of the converging filtering space, where it cooperates with the lower web 2 in the manner illustrated and described with reference to FIG. 1.

As in the earlier-described embodiment, the webs 2 and 3 are again jointly deflected around a large guide roller 10 after leaving the bottom of the filtering space, the guide roller 10 being, for example, a spiral-lobe dandy roll. In the subsequent horizontal roller train of this embodiment the filter webs 2 and 3 are repeatedly subjected to S-shaped path deflections or reversing loops of 180 degrees each. For this purpose, the machine includes several pairs of upper and lower guide rollers, the rollers being appropriately staggered in relation to one another. The first roller pair of the horizontal roller train consists of rollers 15′ and 16′, the second roller pair consisting of rollers 17′ and 18′, and the third roller pair consisting of rollers 19′ and 21′. No provision for progressive compression between opposing rollers is indicated in the arrangement illustrated in FIG. 2, but it should be understood that such an adjustability for compression between the roller pairs could be accomplished in the same way as described in reference to the embodiment of FIG. 1. The end roller 23′ of the horizontal roller train again separates the filter webs 2 and 3, the upper web 3 returning over guide roller 24, and the lower web 2 returning over guide roller 27. As before, the filter cake is removed from the filter webs and deposited onto a loading conveyor 62.

As in the earlier-described embodiment, the lower web 2 is guided and tensioned in its run between the guide roller 27 and the head guide roller 6 by means of an intermediate guide roller 29 and a tensioning roller 31. Similarly, the upper filter web 3 is guided over a guide roller 24, an adjustable roller 32, a tensioning guide roller 30, a second adjustable guide roller 25, and a reversing guide roller 28, from where web 3 begins its earlier-mentioned horizontal run to the head guide roller 7.

The specific filter press embodiments described above are particularly well adapted for the processing of sludges and suspensions containing fibers. A very remarkable degree of drying is obtained with these particular machines which, in the case of settling sludge from sewage treatment installations, can reach in excess of 40 percent, and in the case of other sludges ranges between 25 and 60 percent, depending upon the characteristics of the sludge.

The modified embodiment of FIG. 2, by virtue of its three different treatment sections with different operational characteristics, offers a particularly flexible processing mode in the sense of adaptability to suspensions of varying composition. The versatility and adaptability of the filter press of the invention can be enhanced still further, by mounting the entire assembly on wheels for easy transportation, a preferred mode of such an arrangement taking the form of a trailer.

It should be understood, of course, that the foregoing disclosure describes only preferred embodiments of the invention and that it is intended to cover all changes and modifications of these examples of the invention which fall within the scope of the appended claims.

I claim:

1. A web filter press for the removal of the liquid component from sewage treatment sludge, fiber-containing suspensions, and the like, comprising in combination:
- a machine frame with an elevated head portion;
- an upper endless filter web supported on the machine frame by a plurality of support and guide rollers;
- a lower endless filter web likewise supported on the machine frame by a plurality of support and guide rollers;
- a converging filtering space defined by a common descending run of the up filter webs starting in the head portion of the machine, where the filter webs are guided over two horizontally spaced head guide rollers, the descending filter webs being backed p by supports inclined from the upright so as to converge at an acute angle and to progressively compress any sludge contained between the webs;
- a sludge feeding device mounted in the head portion of the frame, including means for delivering the sludge to the upper end of the filtering space between the head guide rollers;
- a web deflecting spiral-lobe dandy roll so positioned near the lower end of the converging filtering space that the two webs are jointly guided around a major circumference portion of the dandy roll and into an upwardly directed run from which some of the liquid will flow into the spiral lobes of the dandy roll, which lobes, by virtue of their spiral shape, lift the water away from the filter web;
- a horizontal roller train adjacent the deflecting drum, including at least two pairs of rollers between which the two webs and the sludge solids carried between them are jointly subjected to at least one S-shaped run; each roller pair having a roller supporting the lower web and a roller bearing down on the upper web; the roller train including means for adjusting the roller pressure between the roller pairs; and an entry guide roller of the roller train being so arranged in relation to the dandy roll that the web portions running between them leave the dandy roll in a substantially vertical direction;
- means for driving the filter webs at a common speed; and
- means for centering the filter webs along their endless runs.

2. A machine as defined in claim 1, wherein:
- the interior space of the dandy roll is subjected to a negative air pressure.

3. A machine as defined in claim 1, wherein:
- the roller pairs of the horizontal roller train are so arranged that the web run portion which is compressed between a pair of rollers runs with an upward motion component into the space between the compressing rollers.

4. A machine as defined in claim 3, wherein:
- the roller pairs of the roller train are arranged in a staggered fashion along the web, each roller deflecting the webs by at least 90 degrees.

5. A machine as defined in claim 3, wherein:
- the horizontal roller train includes at least three roller pairs which are so arranged that the S-shaped web runs between them are progressively more pronounced in terms of web deflection; and
- the roller pressure adjusting means includes means for independently setting the web compression between each roller pair so as to obtain, for example, a progressively higher web compression, as the webs run from roller pair to roller pair.

6. A machine as defined in claim 5, wherein:

the roller pressure adjusting means for a particular roller pair includes: a pivot lever supporting the upper roller of the roller pair; a pivot connection between the pivot lever and the machine frame; and a pressure cylinder engaging the pivot lever so as to adjustably determine the position of the upper roller relative to the machine and to the lower roller of the roller pair.

7. A machine as defined in claim 1, wherein:

the filter web driving means is associated with the last roller pair in the horizontal roller train;

the filter webs part into separate runs after leaving this roller pair, the parting run of the lower filter web being downwardly oriented for the discharge of the sludge solids therefrom; and the machine further includes means for scraping the sludge solids from the parting filter webs.

8. A machine as defined in claim 1, wherein:

the machine frame includes wheels and a trailing attachment so as to render the filter press mobile.

9. A web filter press for the removal of the liquid component from sewage treatment sludge, fiber-containing suspensions, and the like, comprising in combination:

a machine frame with an elevated head portion;

an upper endless filter web supported on the machine frame by a plurality of support and guide rollers;

a lower endless filter web likewise supported on the machine frame by a plurality of support and guide rollers;

a converging filtering space defined by a common descending run of the two filter webs starting in the head portion of the machine, where the filter webs are guided over two horizontally spaced head guide rollers, the descending filter webs being backed up by supports inclined from the upright so as to converge at an acute angle and to progressively compress any sludge contained between the webs;

at least portions of the slanted upright supports for the converging web runs in the filtering space are in the form of suction boxes which are subjected to negative air pressure so as to exert a suction effect on the sludge across the filter webs;

a sludge feeding device mounted in the head portion of the frame, including means for delivering the sludge to the upper end of the filtering space between the head guide rollers;

a web deflecting drum near the lower end of the converging filtering space around which the two webs are jointly guided into an at least partially upward-directed run;

a horizontal roller train adjacent the deflecting drum including at least two pairs of rollers between which the two webs and the sludge solids carried between them are jointly subjected to at least one S-shaped run; each roller pair having a roller supporting the lower web and a roller bearing down on the upper web; and the roller train including means for adjusting the roller pressure between the roller pairs;

means for driving the filter webs at a common speed; and means for centering the filter webs along their endless runs.

10. A machine as defined in claim 9, wherein:

the suction boxes of the supports have a web supporting wall composed of a bank of closely spaced stationary guide rollers.

11. A web filter press for the removal of the liquid component from sewage treatment sludge, fiber-containing suspensions, and the like, comprising in combination:

a machine frame with an elevated head portion;

an upper endless filter web supported on the machine frame by a plurality of support and guide rollers;

a lower endless filter web likewise supported on the machine frame by a plurality of support and guide rollers;

a converging filtering space defined by a common descending run of the two filter webs starting in the head portion of the machine, where the filter webs are guided over two horizontally spaced head guide rollers, the descending filter webs being backed up by supports inclined from the upright so as to converge at an actue angle and to progressively compress any sludge contained between the webs;

a sludge feeding device mounted in the head portion of the frame, including means for delivering the sludge to the upper end of the filtering space between the head guide rollers; said means including a substantially horizontal pre-filtering run on one of the two filter belts ahead of its descending run through the converging filtering space, the sludge feeding device depositing the sludge onto said web in the pre-filtering run;

a web deflecting drum near the lower end of the converging filtering space around which the two webs are jointly guided into an at least partially upward-directed run;

a horizontal roller train adjacent the deflecting drum including at least two pairs of rollers between which the two webs and the sludge solids carried between them are jointly subjected to at least one S-shaped run; each roller pair having a roller supporting the lower web and a roller bearing down on the upper web; and the roller train including means for adjusting the roller pressure between the roller pairs;

means for driving the filter webs at a common speed; and means for centering the filter webs along their endless runs.

12. A machine as defined in claim 11, wherein:

the filter web in the pre-filtering run is supported by a suction box having apertures in its upper wall, the interior of the suction box being subjected to negative air pressure.

* * * * *